Figure 17:
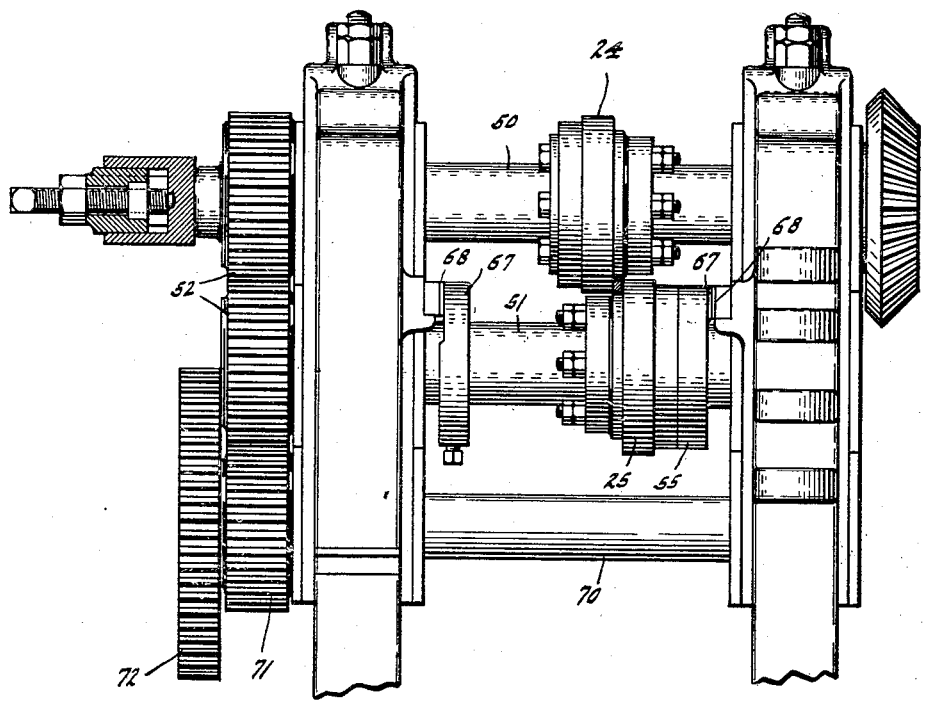

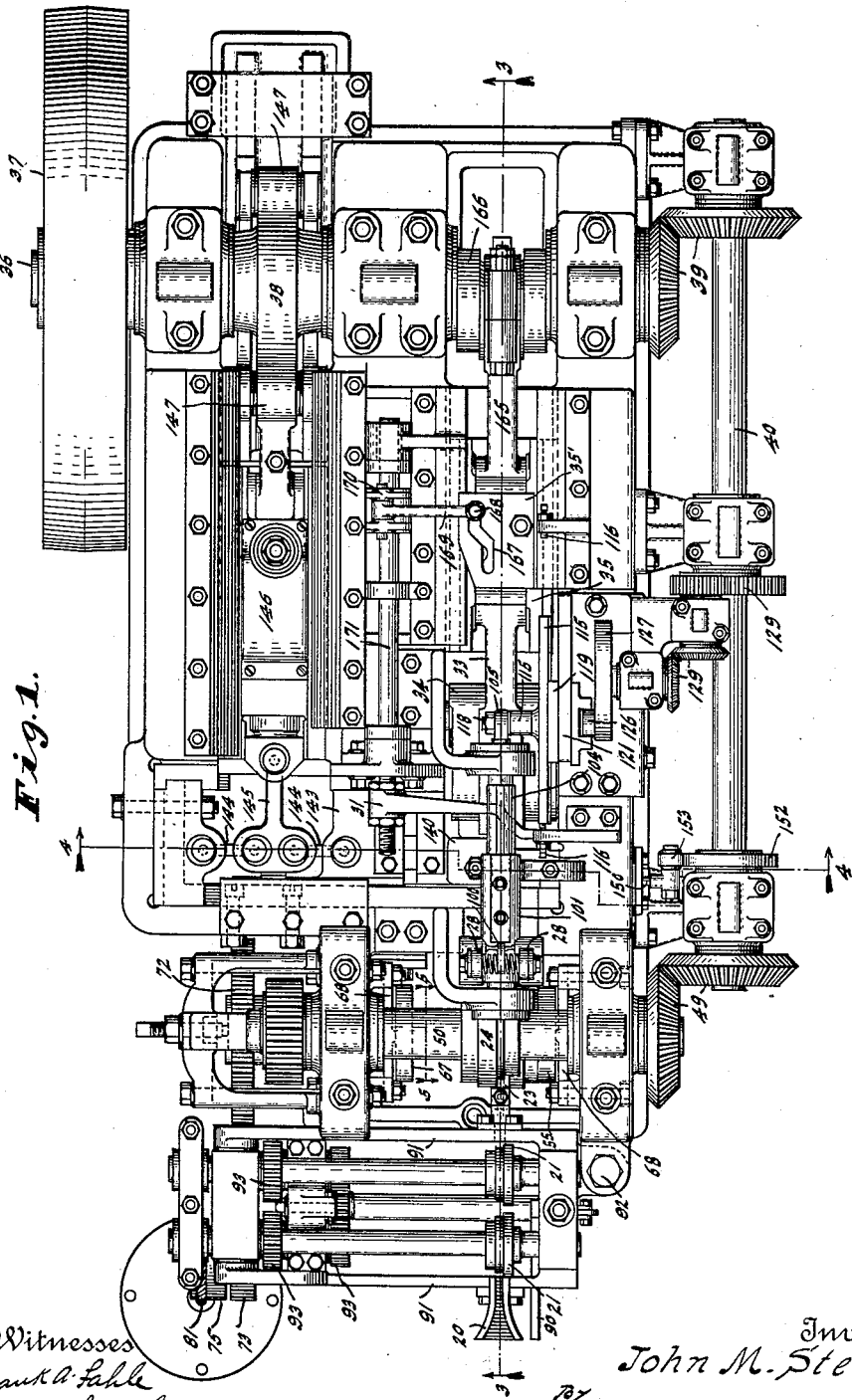

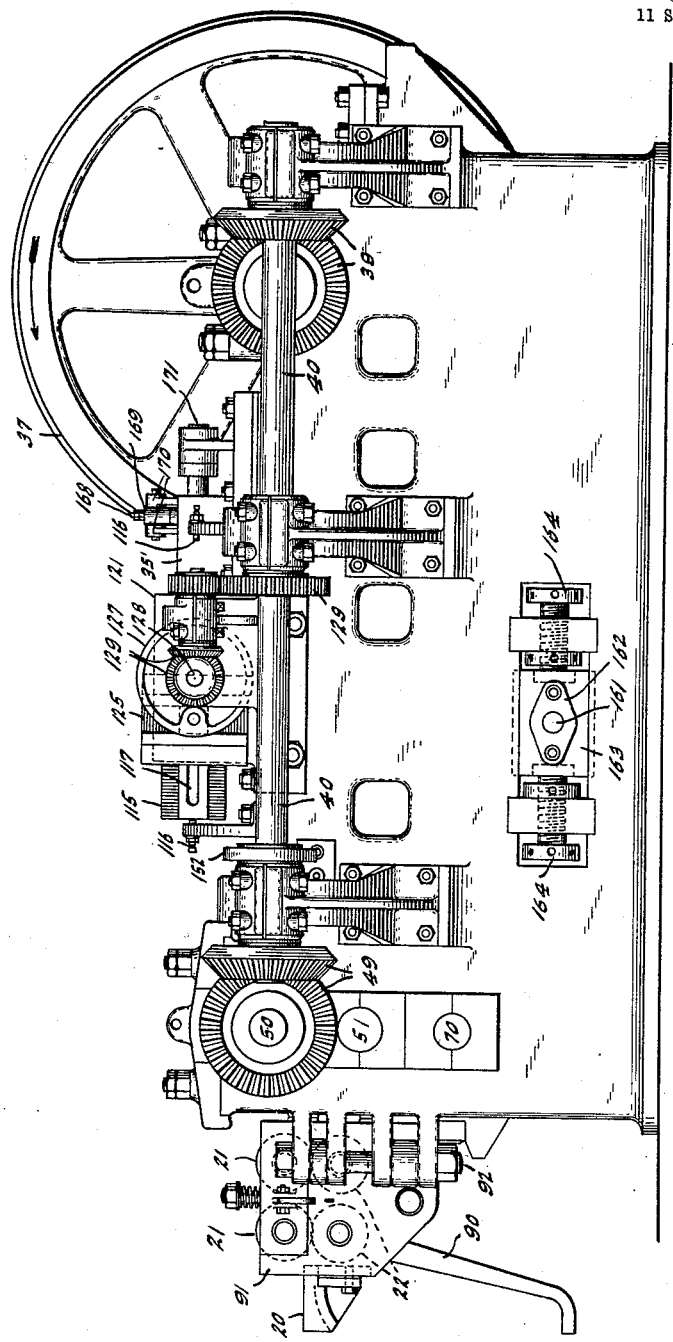

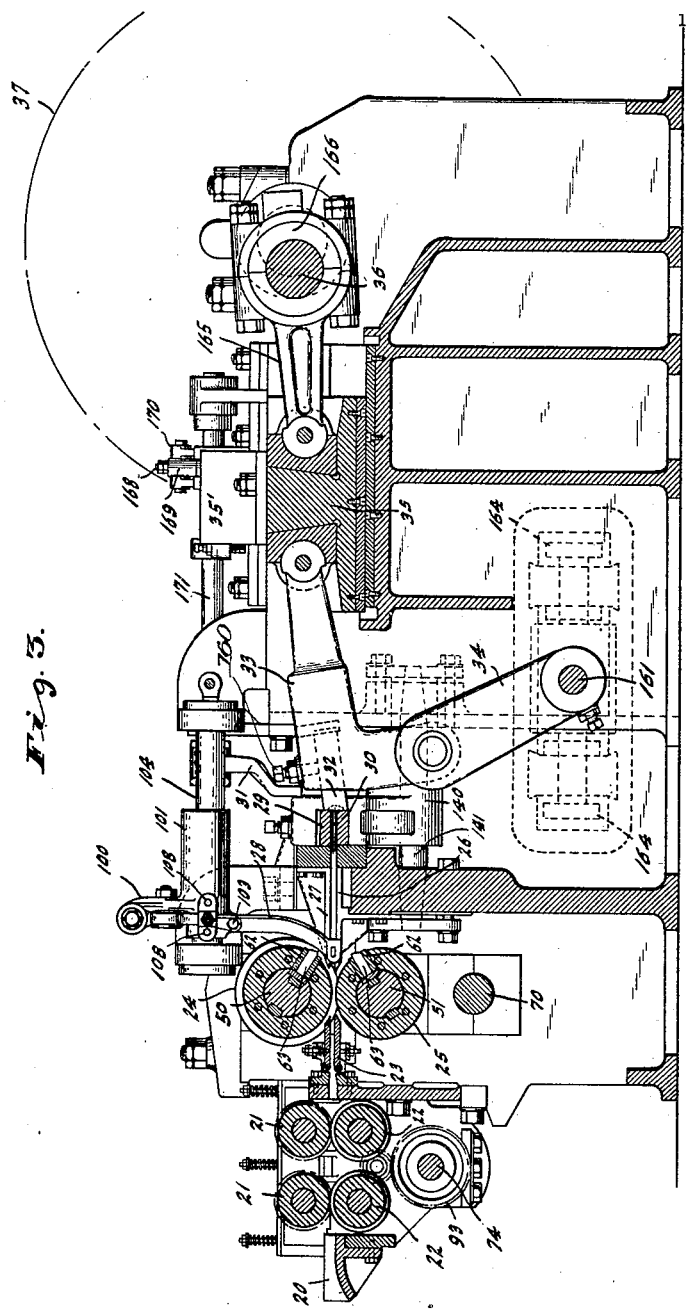

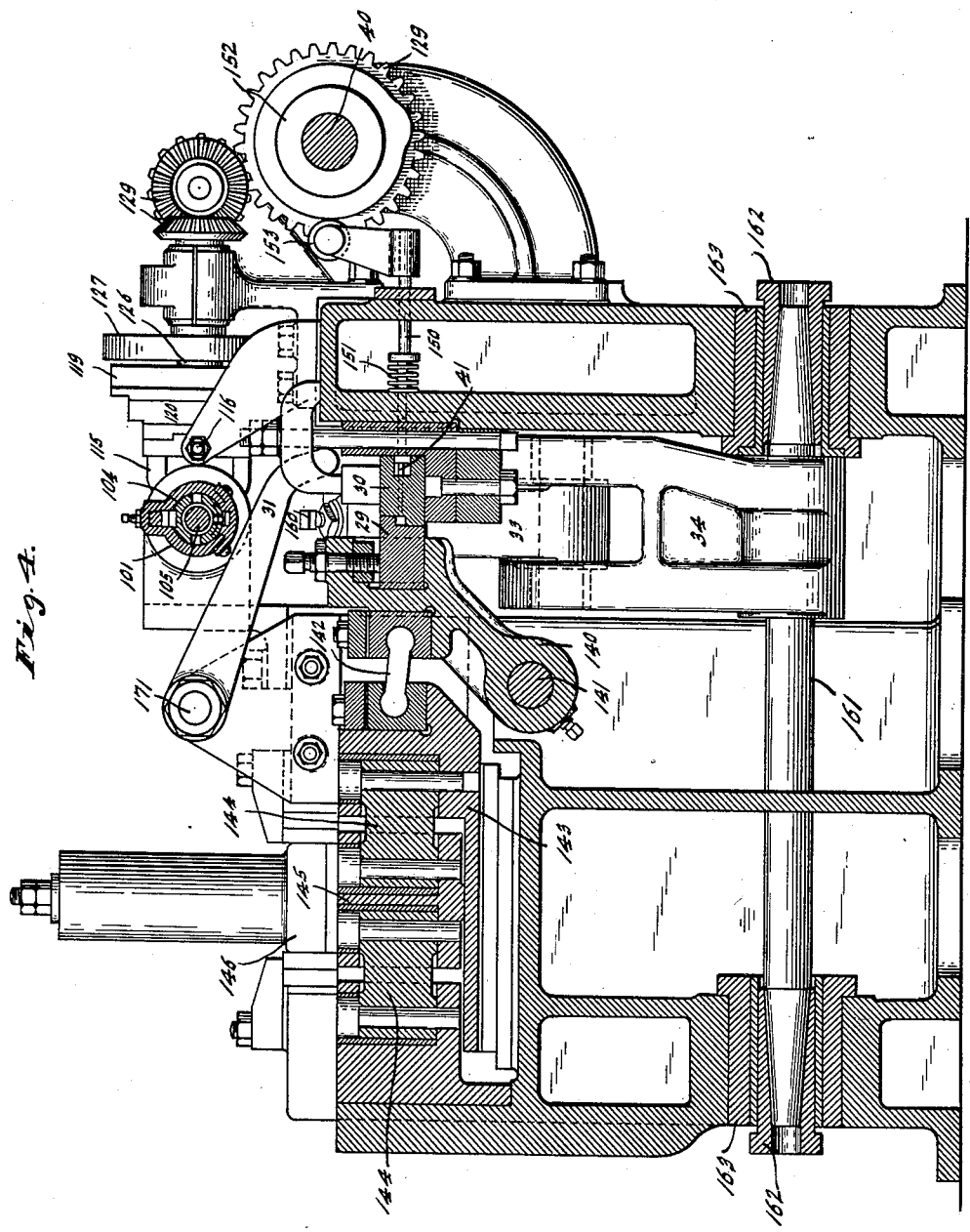

J. M. STETTER.
SPIKE MACHINE.
APPLICATION FILED SEPT. 26, 1912.
1,070,744.
Patented Aug. 19, 1913.
11 SHEETS—SHEET 5.
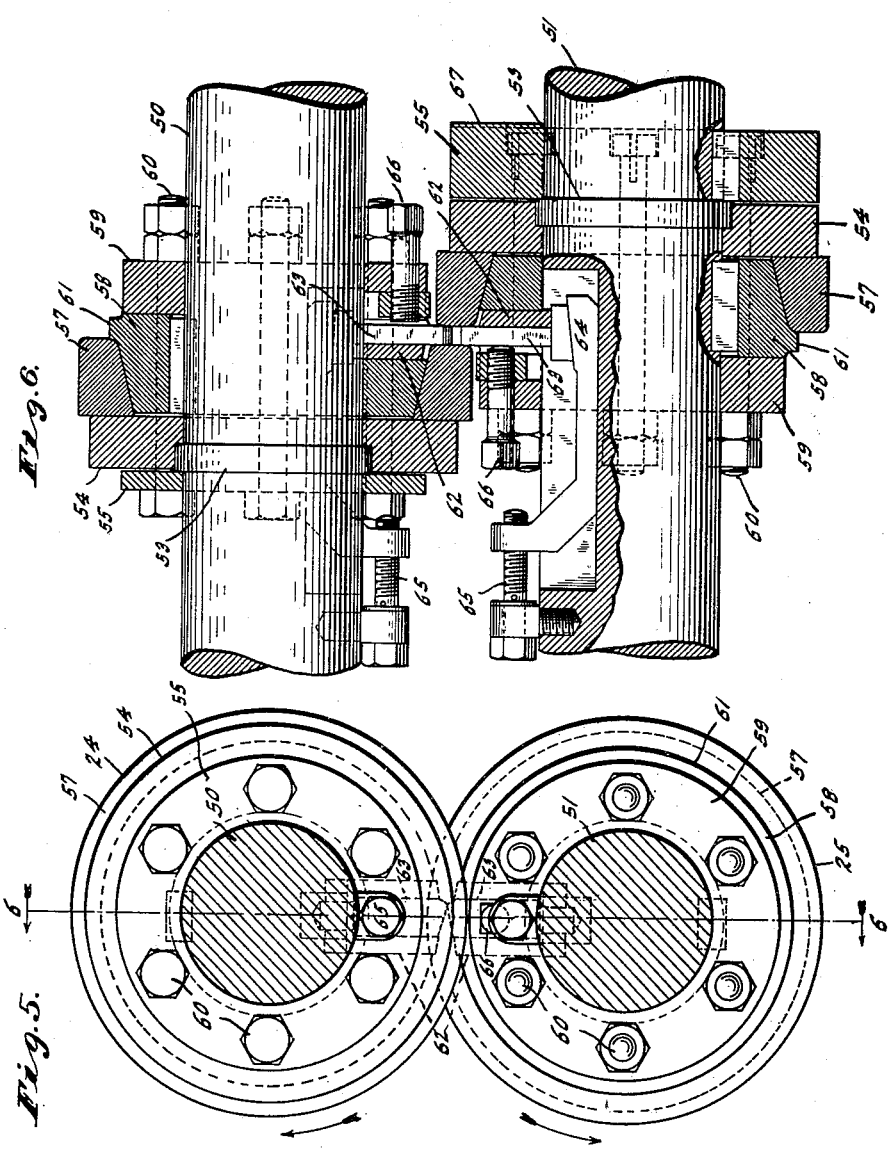

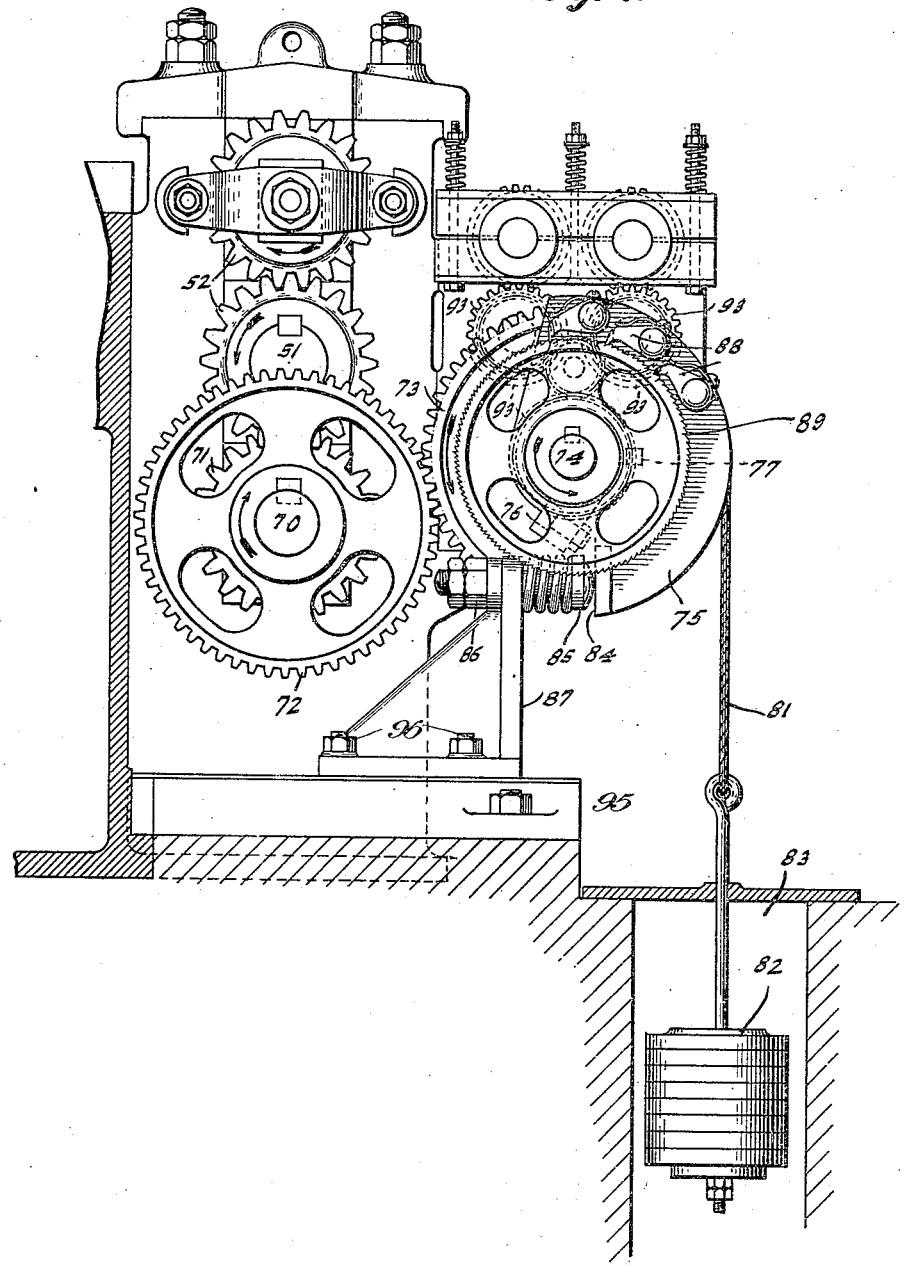

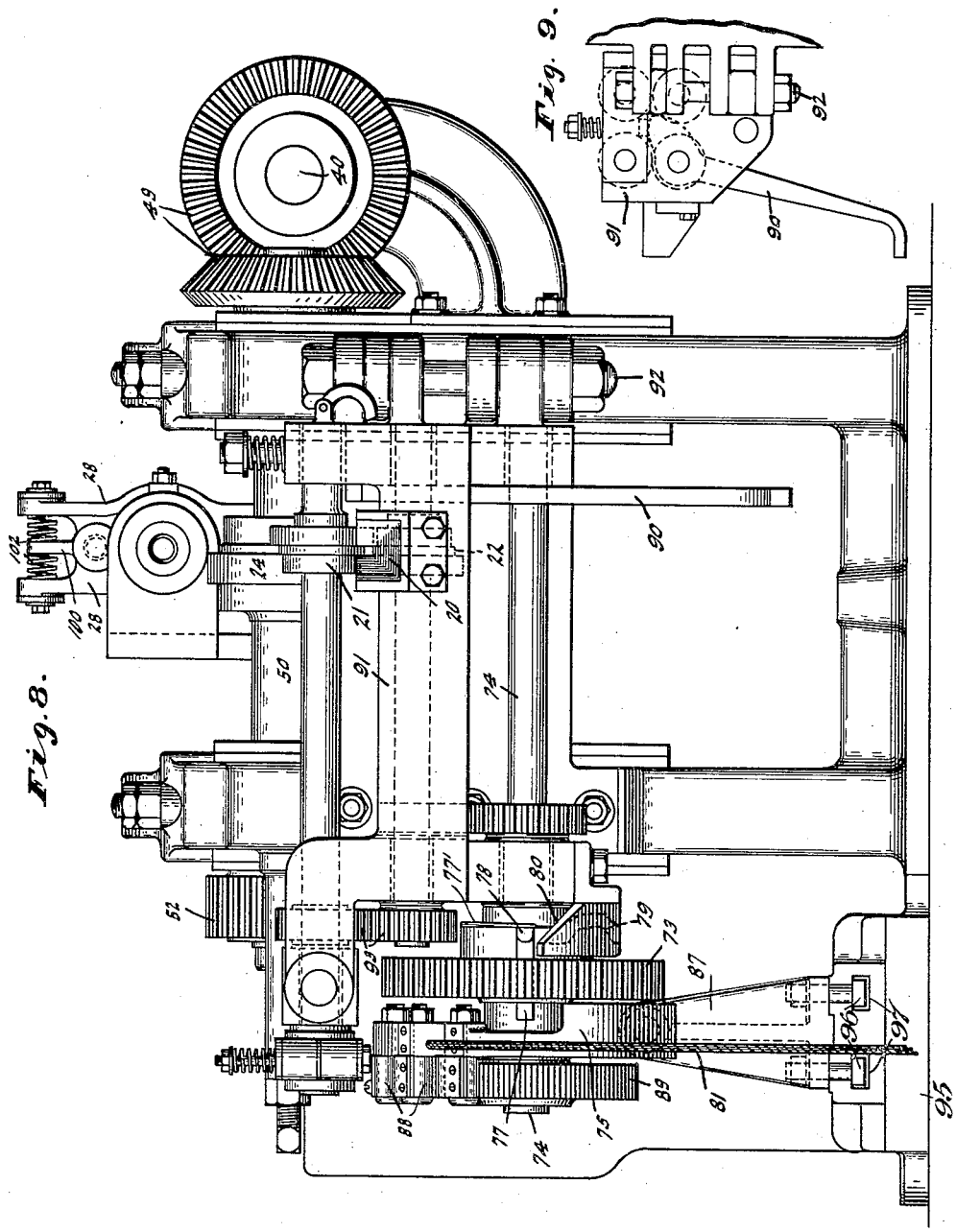

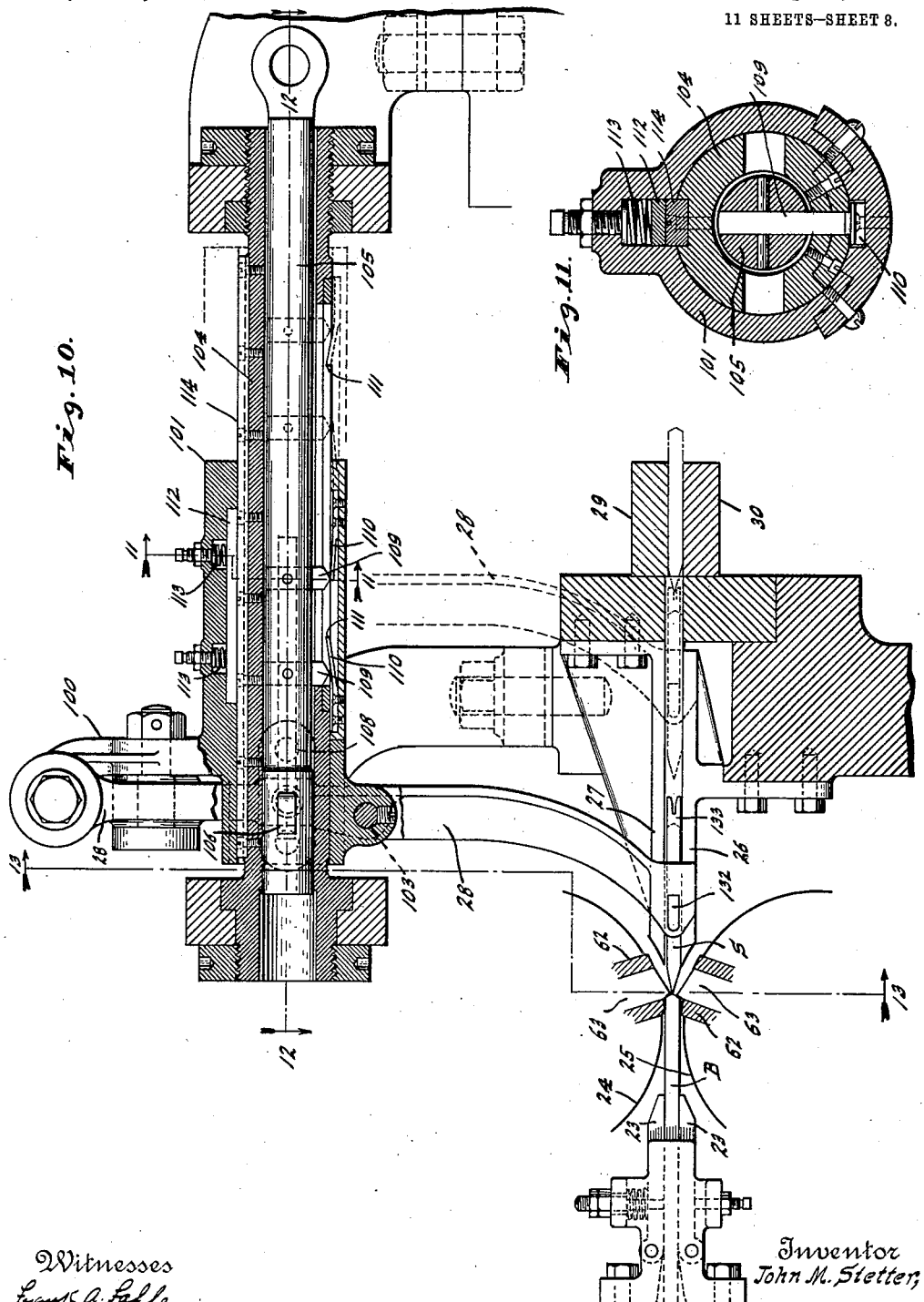

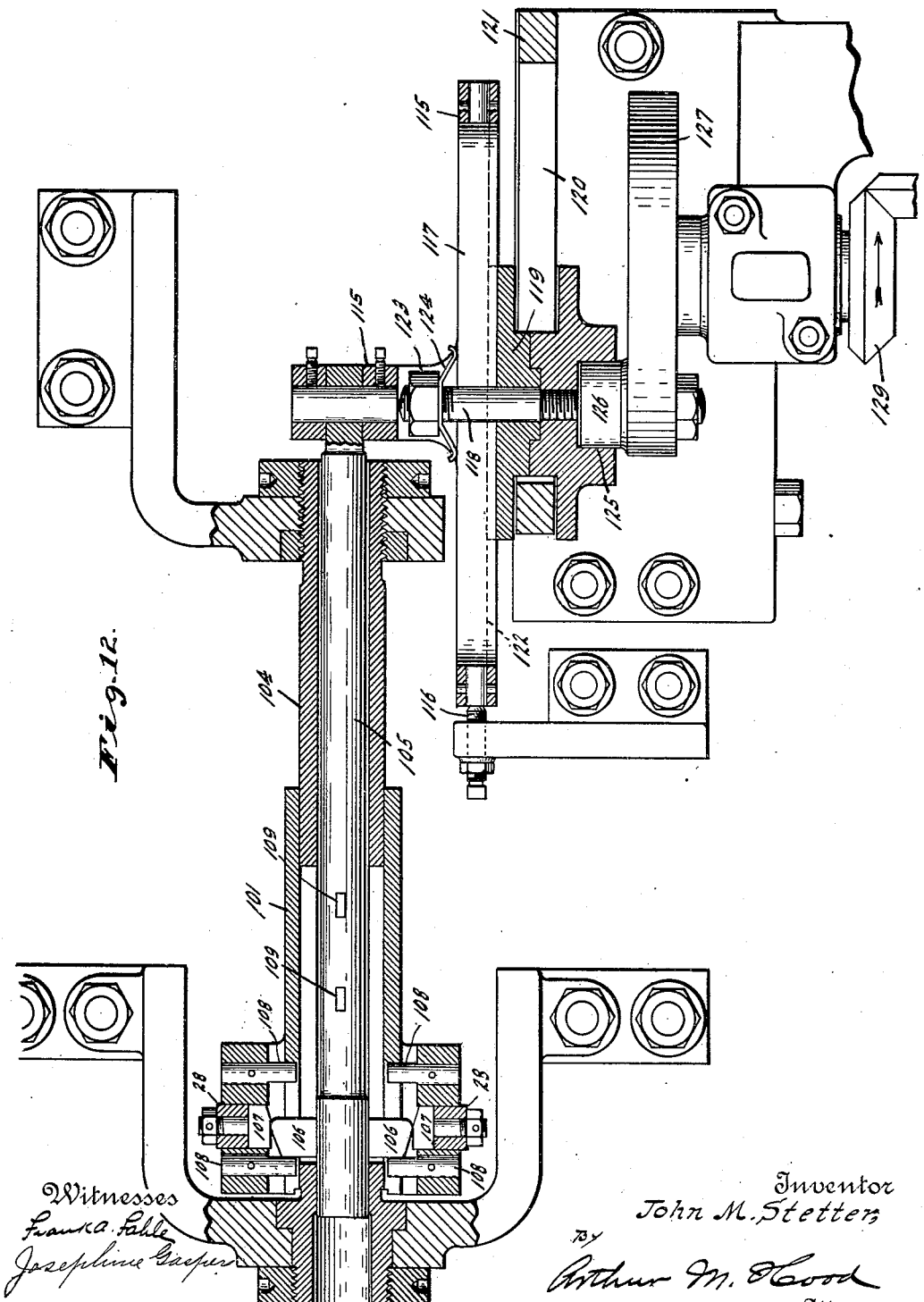

J. M. STETTER.
SPIKE MACHINE.
APPLICATION FILED SEPT. 26, 1912.
1,070,744.
Patented Aug. 19, 1913.
11 SHEETS—SHEET 10.
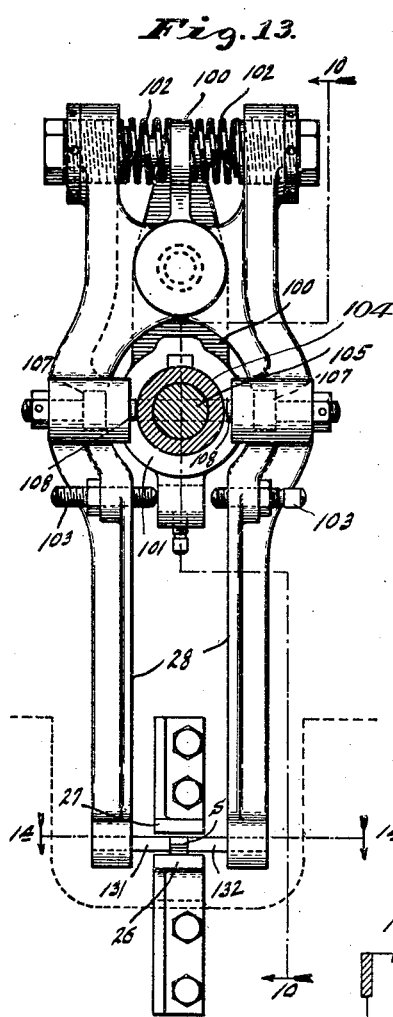
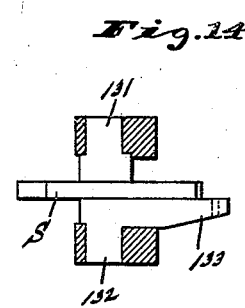
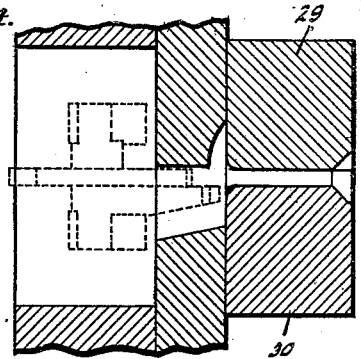
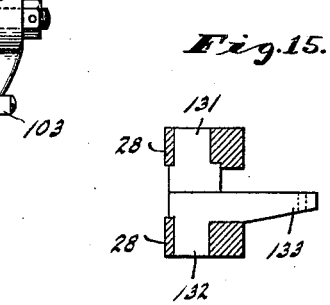
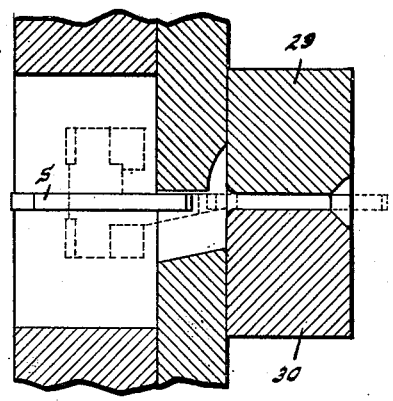
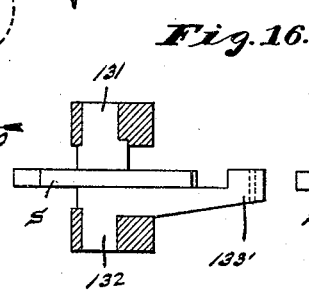
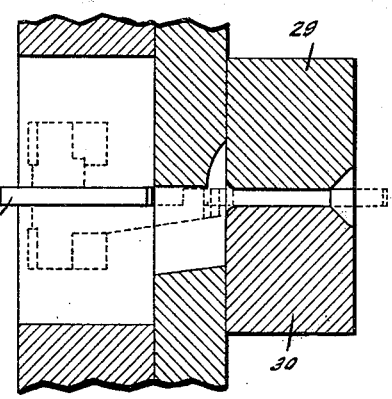
Witnesses
Frank O. Fahle
Josephine Gasper
Inventor
John M. Stetter,
By Arthur M. Hood
Attorney

UNITED STATES PATENT OFFICE.

JOHN M. STETTER, OF MUNCIE, INDIANA.

SPIKE-MACHINE.

1,070,744.  Specification of Letters Patent.  Patented Aug. 19, 1913.

Application filed September 26, 1912. Serial No. 722,541.

*To all whom it may concern:*

Be it known that I, JOHN M. STETTER, a citizen of the United States, residing at Muncie, in the county of Delaware and State of Indiana, have invented a new and useful Spike-Machine, of which the following is a specification.

Railway spikes have generally been made either by the so-called "automatic" machine or by the so-called "hand" machine. The "automatic" machine, which makes the spikes from a continuous bar, cutting off each spike as it makes it, produces a spike having a good point but a poor head, owing to the fact that as the head is formed the body of the spike is not totally surrounded by a matrix or box and as a result the material which forms the head swells or flows out of shape where it is not supported. This produces a swell on the back side of the body of the spike under the head, which makes it almost impossible to insert a crow bar in case it is desired to withdraw the spike from the tie. On the other hand, the "hand" machine produces a spike having a good head but a poor point, because the matrix totally surrounds the spike bar except where the point is to be formed, at which place, because of the point forming method used, the sides of the blank are unsupported and the point is allowed to swell sidewise when formed, so that the point is wider than the body of the spike. This is undesirable because as the spike is driven into place in the tie it produces a hole which is wider than the body of the spike; thus leaving an opening for the entrance of moisture to rot the tie.

It is the primary object of this invention to produce a machine which will make a spike having both a good head and a good point.

It is a further object to provide a machine in which the length of the spike may be adjusted without replacing the whole or some essential part of the cutting off or pointing mechanism. In the ordinary "automatic" machine, the spikes are cut off from the bar by means of nipper rolls having cutting jaws which come together and squeeze off a sufficient length to form a spike, at the same time forming the point of the spike. Between adjacent pairs of cutting jaws the nipper rolls act as feed rolls to feed the spike forward, so that the length of the spike is determined by the circumferential distance between the cutting jaws of the nipper rolls. As a result it is necessary to have different nipper rolls for each length of spike. In overcoming this difficulty, I provide nipper rolls which feed the spike bar forward only a minimum distance, not greater than the minimum length of spike required, and provide auxiliary feed rolls for furnishing the remainder of the feed. The amount of additional feed by the auxiliary feed rolls is adjustable, such auxiliary feed rolls operating intermittently and making one movement for each spike cut off. The intermittent operation of the auxiliary feed rolls is obtained by a mechanism which makes the rolls operate at a uniform speed when operating at all, thus avoiding the common difficulty in intermittently operating devices of having the movement start slowly, speed up to a maximum, and then decrease to a gradual stop. I also provide a special form of feed mechanism for carrying the spike blank, after it has been cut off from the spike bar and its point has been formed by the nipper rolls, to the dies in which the spike blank is to be held while the head is formed. This movement of the spike blank after it has been cut off is limited by a gage, the feed mechanism being so constructed that it allows certain slipping in case there is a tendency to carry the spike blank too far or if the machine clogs up.

Other features of my invention will appear hereinafter.

The accompanying drawings illustrate my invention.

Figure 1 is a plan of a spike machine embodying my invention; Fig. 2 is a side elevation of such machine; Fig. 3 is a section on the line 3—3 of Fig. 1; Fig. 4 is a section on the line 4—4 of Fig. 1; Fig. 5 is an enlarged section showing the nipper rolls, being taken on the line 5—5 of Fig. 1; Fig. 6 is a section substantially on the line 6—6 of Fig. 5; Fig. 7 is a side elevation of the driving mechanism for the auxiliary feed rolls; Fig. 8 is a front elevation of the machine, showing the auxiliary feed drive; Fig. 9 is a side view showing the releasing mechanism for the auxiliary feed rolls; Fig. 10 is a section on the line 10—10 of Fig.

Figure 18:
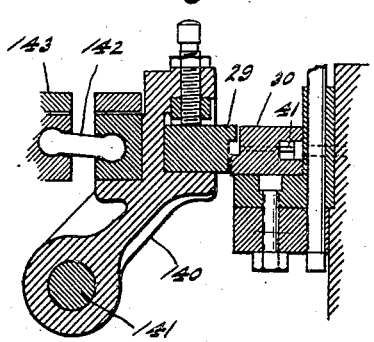
Figure 19:
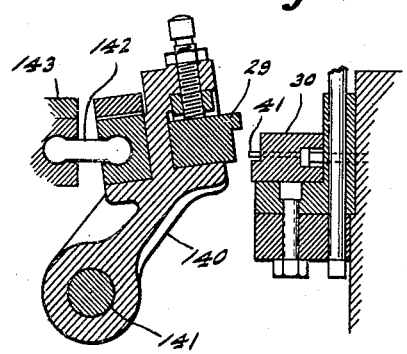

13, showing the feed mechanism for the spike blanks after they are cut off; Fig. 11 is an enlarged section on the line 11—11 of Fig. 10; Fig. 12 is a section on the line 12—12 of Fig. 10; Fig. 13 is a section on the line 13—13 of Fig. 10; Fig. 14 is a section on the line 14—14 of Fig. 13, also showing the dies and adjacent parts; Fig. 15 is a view similar to Fig. 14, but with the spike blank moved forward to the next position; Fig. 16 is a view similar to Fig. 14 or 15, but showing a modified form of feeding mechanism for the spike blank; Fig. 17 is a partial front elevation of the machine, with the auxiliary feed mechanism removed; and Figs. 18 and 19 are views showing the relative positions of the dies during the feeding of the spike blank and the discharging of the finished spike, respectively.

The heated bar B from which the spikes are to be made is fed from the furnace into a guide channel 20, passing from there between upper and lower intermittently operating feed rolls 21 and 22, thence between spring operated centering bars 23, and between constantly operating nipper rolls 24 and 25. The nipper rolls cut off a spike blank S, of a length depending upon the amount of movement of the auxiliary feed rolls 21 and 22, and at the same time form a perfect point on such spike blank. The nipper rolls carry the spike blank S upon a shelf 26, above which is a protecting and guide plate 27, and the spike blank is there picked up by feed fingers 28 and carried forward, in a manner hereinafter more fully explained, to its position between two dies 29 and 30. These two dies are relatively movable, and serve as guides for the spike blank as it is being brought into position, and are then moved, in a manner hereinafter explained, toward each other to clamp the spike blank with a suitable portion, for forming the spike head, projecting beyond the dies. The amount of this projection is determined by a swinging gage finger 31, which is swung to and from gaging position at the proper times, as hereinafter apparent. After the spike blank has been gripped by the dies 29 and 30, the projecting part is pressed down to form the head by a header die 32 carried in a header 33. This header is pivotally mounted near one end on a swinging arm 34, and is pivoted to a reciprocable header slide 35 operated by the main drive shaft 36. This shaft 36 is driven in any suitable manner, as by a driving pulley 37, and in turn furnishes the driving power for all the moving parts of the machine. The driving shaft 36 is provided with a cam 38 which produces the relative movement between the dies 29 and 30, as hereinafter set forth; and is connected by bevel gears 39 to a longitudinal countershaft 40, which, by suitable mechanism, drives the feed fingers 28 for the spike blanks, the kicker rod 41 for removing the finished spikes from between the dies 29 and 30, and the nipper rolls, the auxiliary feed rolls being in turn driven from the nipper rolls.

The nipper rolls 24 and 25 are carried by two oppositely rotating shafts 50 and 51, geared together by a 1-to-1 gearing 52. The shaft 50 is driven through bevel gearing 49, from the countershaft 40. Each shaft 50 and 51 is provided with an integral or otherwise attached collar 53, around and against one side of which fits a clamping disk 54 with which coöperates a clamping plate 55 bearing against the other side of the collar 53. A chill plate 57 bears against that side of each clamping disk 54 opposite the corresponding collar 53, and is cone-shaped internally to receive a clamping cone 58 against which bears a disk 59, clamping bolts 60 firmly holding together the parts 55, 54, 57, 58, and 59, and clamping them upon the collar 53. The parts just specified are oppositely arranged on the two shafts 50 and 51, as clearly shown in Fig. 6, and the cylindrical surfaces 61 at the large ends of the clamping cones 58 are in the same plane, but are spaced apart a distance greater than the thickness of the rod B from which the spikes are to be made.

At one or more points in its periphery, each clamping cone 58 is cut away at its cylindrical surface 61 and partway along the conical surface, to receive a feeding segment 62. This feeding segment is cut away in the plane of the cylindrical surface 61 to receive a nipper jaw or bar 63, the end of which is pointed as clearly shown in Fig. 5. The points of the two nipper bars 63, which are in the same vertical plane as the spike bar B, meet as the nipper rolls rotate, and the adjacent surfaces of the feeding segments 62, also in the same plane, are spaced apart, when opposite each other, just sufficiently that they firmly grasp the spike bar. Each nipper jaw and its corresponding segment are adjustable radially by a wedge 64, suitably mounted in a slot in the surface of the shaft 50 or 51 and extending along said shaft to a convenient point where it projects upward from the surface of the shaft and receives an adjusting screw 65. When properly adjusted, the nipper bar 63 and feeding segments 62 may be locked or clamped in place by a clamping screw 66. The nipper surfaces of the nipper bars 63 are of the proper shape to give the desired form of point to the spike, and the circumferential distance from one edge of the feeding segment 62 to the other determines the minimum length of spike which can be made on the machine.

As the point of the spike is formed, it is prevented from spreading sidewise by the overlapping chill plates 57, which at this time bear firmly against the sides of the spike bar B. At all other times in order not to interfere with the feeding action of the auxiliary feed rolls, the chill plates are spaced farther apart, so that they do not grip the sides of the spike bar. To produce this result, the shaft 51 is made movable endwise, and is provided with cams 67 which coöperate with cams 68 on the frame of the machine to move the shaft 51 endwise in opposite directions, at the proper times, to bring the two chill plates closer together to grip the spike bar B as the nipper jaws approach each other and to separate them after a spike blank S, with its formed point, has been severed from the spike bar B. One of the cams 67 may conveniently be formed on a face of the clamping plate 55 on the shaft 51. The chill plates 57 also absorb heat from the nipper bars 63 and the feeding segments 62, so as to prevent such nipper bars and feeding segments from becoming too much heated by their continually engaging the heated spike bar. The chill plates themselves do not become excessively heated because of their comparatively great mass and radiating surface.

Below the shaft 51 and in the same vertical plane with the shafts 50 and 51 is a shaft 70, driven at a suitable speed from the shaft 51 by means of a gear 71 meshing with the lower one of the two gears 52. It is by means of this shaft 70 that the auxiliary feed mechanism is driven. A gear 72 on the shaft 70 meshes with a gear 73 loosely mounted on a shaft 74. Also loosely mounted on the shaft 74 is a pulley segment 75, provided with a shoulder 76 with which coöperates a pin 77 extending through the gear 73 parallel to the axis thereof and spring-pressed toward the pulley segment 75 by a spring 77'. The pin 77 has an upturned end 78, which at certain points in the rotation of the gear 73 coöperates with a groove 79 in a stationary cam 80 fixed on the frame of the machine. The cam groove 79 moves the pin 77 into and out of the plane of the shoulder 76. The pulley segment 75 has fixed to it a rope or cable 81, carrying a weight 82 suspended in a pit 83 in the floor or ground. By means of the weight 82, the pulley segment 75 is biased in a clockwise direction (Fig. 7) to its limiting position, in which a shoulder 84 on said pulley segment bears against a spring-pressed plunger 85. This limit of movement may be adjusted by adjusting the spring-pressed plunger 85 by means of a nut 86 or by moving lengthwise of the plunger 85 the supporting standard 87 on which it is mounted. A convenient way to provide for this movement of the standard 87 is to fasten such standard to its supporting base plate 95 by bolts 96, the heads of which fit in longitudinal grooves 97 in such base 95 and are slidable along such grooves when the bolts are loosened. The pulley segment 75 is provided with one or more pawls 88, which coöperate with a ratchet wheel 89 fixed on the shaft 74. This shaft 74 is connected to the shafts carrying the auxiliary feed rolls 21 and 22, of which there may be two or more pairs in order to insure an accurate speed of the spike bar, by means of suitable gearing 93, such as illustrated in Fig. 7.

In operation, the gear 72 drives the gear 73 constantly, and at each revolution of the gear 73, (that is, at each operation of the nipper jaws,) the pin 77 engages the shoulder 76 and carries the pulley segment 75 with the gear 73 in a counter-clockwise direction, the pulley segment 75 and the gear 73 moving together while the pin 77 bears against the shoulder 76. At a predetermined point, the cam groove 79, engaging the upturned end 78 of the pin 77, withdraws such pin from engagement with the shoulder 76, thereby allowing the pulley segment 75 to be drawn backward to its normal position by means of the weights 82. The spring surrounding the plunger 85 takes any shock which may occur. In the aforesaid counter-clockwise movement of the pulley segment 75, one or more of the pawls 88 engages a tooth of the ratchet 89, thereby carrying such ratchet and the shaft 74 forward, or in a counter-clockwise direction. This produces the proper feeding movement of the auxiliary feed rolls 21 and 22. The amount of such movement of the auxiliary feed rolls is determined by the setting of the plunger 85, the point of release of the pin 77 from the shoulder 76 at the cessation of the feeding movement being the same for all length of spikes. During part, and preferably the last part, of this feeding movement by the auxiliary feed rolls, the nipper rolls are also feeding the spike bar forward at the same speed and cutting off a spike blank therefrom. The auxiliary feed rolls always feed the spike bar forward a sufficient distance to form the body and head of the spike, and the nipper rolls and auxiliary feed rolls together feed the spike bar forward during the forming of the point, at which latter time only do the nipper rolls confine the spike bar. If spikes of different length are required, it is thus merely necessary to adjust the amount of feed produced by the auxiliary feed rolls 21 and 22. It is not necessary to replace the entire nipper rolls.

To facilitate the first insertion of the spike bar between the feed rolls, the upper roll or rolls 21 may be raised by the depressing of a foot lever 90, as is clearly shown in Fig. 9. The auxiliary feed mechanism, comprising the parts numbered from 73 to 90, and 93, are all carried on a frame 91, which is hinged by a pin 92 on the main frame of the machine. This permits the auxiliary feed mechanism to be swung out away from the nipper rolls and adjacent parts, which is advantageous for many reasons.

The spike bar, as has been stated, after passing through the auxiliary feed rolls, passes between the centering plates 23, which by their friction on the spike bar are to prevent the latter, especially when but a short end, from being overfed by momentum, and are also to center it between the nipper rolls 24 and 25; and the cut off spike blanks, after leaving the nipper rolls, pass upon the shelf 26 below the plate 27. There is just enough space between the shelf and the plate, which serve as stripper plates or delivering guides, to allow the easy passage of the spike blanks. The spike blank is now carried forward to the dies by means of the feed fingers 28. These feed fingers 28 are pivoted on an upward projection 100 of a tubular slide 101, and project upward beyond their pivotal points, their upper ends being pressed apart by a spring 102. The spring 102 therefore tends to close the lower ends of the feed fingers upon the spike blank, such closing movement being limited by limiting screws 103. The frame 101 is mounted on a stationary tube 104, suitably and adjustably mounted in the main frame of the machine. A reciprocating rod 105 extends through the tube 104 and the slide 101, and at one end is provided with a horizontal camming cross bar 106, the ends of which are oblique and coöperate with inwardly extending cam blocks 107 carried by the feed fingers 28 below their pivotal points. Thus by moving the rod 105 lengthwise relatively to the tubular slide 101, the coöperating cams 106 and 107 either force the lower ends of the feed fingers 28 apart, against the action of the spring 102, or else allow such feed fingers to be pushed together at their lower ends by the action of such spring. The amount of relative movement between the rod 105 and the slide 101 is limited by pins 108 which project inward from such slide into the path of the cross bar 106. The tube 104 is suitably slotted to allow the bar 106 to project through to coöperate with the cam blocks 107. The tube 104 is also slotted at the bottom, as shown in Fig. 10, to allow two cam fingers 109 to project through and coöperate with spring fingers 110. These spring fingers bear upwardly against the bottom of the tube 104, and at the two limits of movement of the slide 101, by which such fingers are carried, respectively engage oppositely facing notches 111 in the lower surface of said tube 104. The spring fingers 110 thus serve to lock the slide 101 against movement until they are pushed out of place by the coöperating cam fingers 109, such pushing taking place at the completion of the desired lost motion between the parts 105 and 101, or at the ends of the lost motion allowed by the pins 108. This makes a positive lost motion device.

A pressure bar 112 is seated in a groove in the inner upper surface of the tubular slide 101, and is spring-pressed downwardly, by adjustable springs 113, against a spline 114 fixed to the frame 104 and fitting in the groove in the slide 101. This serves to keep the parts in snug engagement and to prevent them from turning relatively to each other.

The end of the rod 105 opposite that which carries the cross bar 106 is fixed to a sliding frame 115, which may slide longitudinally between two adjustable stops 116. The sliding frame 115 is slotted longitudinally at 117, and a bolt 118 projects through this slot into a two-part slide 119 mounted in a horizontal slot 120 in a frame 121 fixed to the main machine frame. The slide 119 has a tongue and groove sliding fit 122 with the sliding frame 115, and beneath the nut 123 on the bolt 118 is a leaf spring 124 which bears against the surface of the sliding frame 115 opposite the slide 119. The slide 119 has a vertical groove 125 in its face remote from the sliding frame 115, and in this groove 125 fits a roller 126 eccentrically mounted on a disk 127 carried by a stub shaft 128. This stub shaft is driven by a suitable gearing 129 from the countershaft 40. By reason of this construction, the disk 127 and the slide 119 may continue in motion even if the movement of the feed fingers 28, the frame 101, and the rod 105 is obstructed for any reason, as because of a spike stuck in the machine. However, by reason of the stops 116, as soon as the obstruction is removed, the parts return to their normal relative positions as the operation of the machine continues.

The lower ends of the feed fingers 28 are provided with gripping jaws 131 and 132 respectively. The gripping jaw 132 has a slotted projection 133 for engaging the point of the spike blank S at a certain point in the cycle. After the spike has been cut off by the nipper rolls and has dropped on the shelf 26, the various parts, being properly timed, begin to move the feed fingers to the right (Figs. 10 and 14), the immediately preceding movement of the rod 105 having allowed the lower ends of the feed fingers 28 to swing inward so that the gripping jaws 131 and 132 may engage the sides of the spike blank S. As the feed fingers 28 move to the right, they carry the spike blank S with them from the position shown in full lines in Figs. 10 and 14 to the position shown in full lines in Fig. 15 and in dotted lines in Figs. 10 and 14. Then the feed fingers are separated by the movement of the rod 105 to the left, and are brought back to their full line position (Fig. 10). Again the rod 105 moves to the right, allowing the feed fingers again to swing inwardly. At this time, however, there is no spike blank between the gripping jaws 131 and 132, and in consequence the feed finger carrying the jaw 132 (the corresponding set screw 103 being adjusted properly) brings it to the position shown in Fig. 15 in full lines. This brings the slotted projection 133 of the gripping jaw 132 into alinement with the spike blank. As the feed fingers now a second time move to the right, the projection 133 fits over the point of the spike blank S and pushes it between the dies 29 and 30 or to the position shown in dotted lines in Fig. 15 and in dot and dash lines in Fig. 10. This movement of the spike blank is limited by the gage 31, the spring 124 allowing relative slipping between the sliding frame 115 and the two-part slide 119 in case the end of the spike blank strikes such gage before the movement of the slide 119 to the right (Fig. 12) is completed. After the spike blank has been pushed into place by the gripping jaw 132, the feed fingers return again to the full line position shown in Fig. 10. Thus to move the spike blank from the full line position shown in Figs. 10 and 14 to the dotted line position shown in Fig. 15 or the dot and dash line position shown in Fig. 10, the feed fingers 28 make two complete movements back and forth. As this is done for each spike blank that is cut off, it therefore follows with this construction, and with but one pair of nipper jaws in the nipper rolls, the gearing 129 is a 1-to-2 gearing.

In Fig. 16, there is shown a slight modification of the gripping jaw 132. Here the gripping jaw has a projection 133', which projects into the plane of the spike blank S when the gripping jaws 131 and 132 are gripping such spike blank. With this construction, the gripping jaws act on two spike blanks at each movement, moving one from the initial position on the shelf 26 to the intermediate position by the gripping action of the jaws and moving the other from the intermediate position to the final position between the dies 29 and 30 by the pushing action of the projection 133'. In the backward movement of the gripping jaws the lateral movement thereof allows the projection 133' to pass the spike bar without interfering therewith. With this construction, the feed fingers 28 make but one complete back and forth movement for each spike blank that is cut off, and therefore in this case the gearing 129 is a 1-to-1 gearing.

Each of the dies 29 and 30, when in clamping position, engages two sides of the spike blank S, as clearly shown in Fig. 4.

The dies 30 is fixed in the frame of the machine, so that in the normal operation of the machine it is immovable. The die 29 is clamped in a die-carrying arm 140 fixed on a shaft 141 journaled in the frame of the machine and extending parallel to the countershaft 40. The die-carrying arm 140 is connected by a universally swinging rod 142 to a transversely moving slide 143 (Fig. 4) which is connected by a toggle 144 to the frame of the machine. The knee of this toggle is connected by a link 145 to a slide 146 slidable longitudinally of the frame and provided with rollers 147 which engage the cam 38 on opposite sides thereof. As the shaft 36 rotates, the cam 38 moves the slide 146 forward and backward, and through it and the toggle 144 swings the die-carrying arm 140 forward and back to move the die 29 toward and from the die 30. The cam 38 is so designed that the movement of the die 29 toward the die 30 takes place as the spike blank S is being moved toward the dies, and the die approaches sufficiently close to the die 30 so that, as shown in Fig. 18, the two dies serve as a guide for the spike blank as it is being pushed, by the projection 133 or 133', between the dies. As soon as the spike blank S has been brought to position, the cam 38 completes the clamping movement of the dies, and, as shown in Fig. 4, clamps the die 29 firmly down upon the spike blank to force the latter against the die 30, holding the die 29 in this position until the head has been formed. After the head has been formed on the spike, the cam 38 moves the die 29 away from the die 30 sufficiently far to allow the spike, now finished, to be pushed sidewise away from the die 30, as shown in Fig. 19. This pushing is produced by a kicker rod 150, which extends transversely through the die 30 and is normally spring-withheld by a spring 151. At the proper time in the cycle, the kicker rod 150 is pushed to the left (Figs. 4 and 19) to remove the finished spike from the dies, such pushing being obtained by a cam 152 carried by a countershaft 40 and coöperating with a roller 153 movable with the kicker rod 150. The completed spike falls down through the machine.

The heading of the spike is done by means of the heading die 32, carried by the header 33. Different header dies 32 may be removably fastened in the header 33, being held in place by the clamping screw 160, according to the size and shape of head desired. The swinging arm 34, to which one supporting point of the header 33 is pivoted, in turn is mounted on a shaft 161. This shaft may be adjusted axially, by adjustable bushings 162, in its bearings 163, and the bearings may be adjusted horizontally transverse to the shaft 161 by means of adjusting screws 164, shown in dotted lines in Fig. 3 and in full lines in Fig. 2. This provides for an adjustment for getting different overhangs of the spike head, as desired, and also for the proper setting of the heading tool for different thicknesses of dies 29 and 30. The header slide 35 to which the other supporting point of the header 33 is attached is slidable longitudinally in the frame of the machine, being connected by a pitman 165 to an eccentric 166 on the main driving shaft 36. The upper surface of the slide 35, or of a plate 35' mounted thereon, is provided with a cam slot 167, in which fits a pin 168 carried by a link 169 pivotally connected to an arm 170 fixed on a longitudinally extending rock shaft 171. This rock shaft carries the gage 31, which is thus at the proper time swung into and out of the path of the spike blank S and of the header die 32 as the header slide 35 is moved forward and back.

I claim as my invention:

1. The combination, in a spike machine, of a pair of nipper rolls for cutting off a spike blank from a spike bar and forming a point on such spike blank, said nipper rolls feeding the spike blank forward less than the full amount of feed necessary to form a spike blank of the desired length, and auxiliary rolls for feeding the spike bar a sufficient distance to furnish the spike blank of desired length, such auxiliary feed rolls operating intermittently and when operating having a uniform feed.

2. The combination, in a spike machine, of a pair of nipper rolls for cutting off a spike blank from a spike bar and forming a point on such spike blank, said nipper rolls feeding the spike blank forward less than the full amount of feed necessary to form a spike blank of the desired length, and auxiliary rolls for feeding the spike bar a sufficient distance to furnish the spike blank of desired length.

3. The combination, in a spike machine, of a pair of nipper rolls for cutting off a spike blank from a spike bar and forming a point on such spike blank, said nipper rolls being constructed so that they feed the spike bar forward only at the time of cutting off the spike blank, auxiliary rolls for producing the desired feed of the spike bar to produce a spike blank of desired length, and means for intermittently driving said auxiliary rolls the desired distance between the cutting off of successive spike blanks to produce a spike blank of proper length, said driving mechanism comprising a rotatable member operating continuously and at a uniform speed in one direction, a second rotatable member which may be connected to the first rotatable member to rotate therewith during certain parts of the rotation of the latter but is biased in the opposite direction, and a third rotatable member connected to the auxiliary feed rolls and having a pawl and ratchet connection with the second rotatable member.

4. The combination, in a spike machine, of a pair of nipper rolls for cutting off a spike blank from a spike bar, said nipper rolls being constructed so that they feed the spike bar forward only at the time of cutting off the spike blank, auxiliary rolls for producing the desired feed of the spike bar to produce a spike blank of desired length, and means for intermittently driving said auxiliary rolls the desired distance between the cutting off of successive spike blanks to produce a spike blank of proper length, said driving mechanism comprising a rotatable member operating continuously and at a uniform speed in one direction, a second rotatable member which may be connected to the first rotatable member to rotate therewith during certain parts of the rotation of the latter but is biased in the opposite direction, and a third rotatable member connected to the auxiliary feed rolls and having a pawl and ratchet connection with the second rotatable member.

5. The combination, in a spike machine, of a pair of nipper rolls for cutting off a spike blank from a spike bar, said rolls being shaped to form a point on such spike blank when cutting the latter from the spike bar, said nipper rolls being constructed so that they feed the spike bar forward only at the time of cutting off the spike blank, auxiliary rolls for producing the desired feed of the spike bar to produce a spike blank of desired length, and means for intermittently driving said auxiliary rolls the desired distance between the cutting off of successive spike blanks to produce a spike blank of proper length.

6. The combination, in a spike machine, of a pair of nipper rolls for cutting off a spike blank from a spike bar, said nipper rolls being constructed so that they feed the spike bar forward only at the time of cutting off the spike blank, auxiliary rolls for producing the desired feed of the spike bar to produce a spike blank of desired length, and means for intermittently driving said auxiliary rolls the desired distance between the cutting off of successive spike blanks to produce a spike blank of proper length.

7. The combination, in a spike machine, of a main frame, a pair of nipper rolls mounted therein for cutting off a spike blank from a spike bar, and auxiliary rolls for feeding the spike bar the necessary distance to provide a spike blank of the desired length, said auxiliary feed rolls being mounted in a frame pivoted to the main frame.

8. The combination, in a spike machine, of a main frame, a pair of nipper rolls mounted therein for cutting off a spike blank from a spike bar, auxiliary rolls for feeding the spike bar the necessary distance to provide a spike blank of the desired length, intermittent driving mechanism for the auxiliary feed rolls, a frame in which the auxiliary feed rolls and its driving mechanism are mounted, and a hinge connection between the two frames.

9. The combination, in a spike machine, of a pair of nipper rolls for cutting off a spike blank from a spike bar, and an auxiliary feed mechanism for feeding the spike bar forward the length of a spike blank between each cutting operation of the nipper rolls.

10. The combination, in a spike machine, of a pair of nipper rolls for cutting off a spike blank from a spike bar, and an auxiliary feed mechanism for feeding the spike bar forward the length of a spike blank between each cutting operation of the nipper rolls, the feeding operation of said auxiliary feed mechanism being at a uniform speed.

11. The combination, in a spike machine, of a pair of nipper rolls, each roll comprising a chill plate overlapping the chill plate of the other roll, a nipper jaw, and a feed segment, the feed segment and the nipper jaws being in the same plane and coöperating to cut off a spike blank from a spike bar and feed the spike bar forward a distance less than the length of the spike blank.

12. The combination, in a spike machine, of a pair of nipper rolls, each roll comprising a chill plate overlapping the chill plate of the other roll, a nipper jaw, and a feed segment, the feed segments and the nipper jaws being in the same plane and coöperating to cut off a spike blank from a spike bar and feed the spike bar forward a distance less than the length of the spike blank, and means for adjusting the nipper jaws and feed segments radially.

13. The combination, in a spike machine, of a pair of nipper rolls, each roll comprising a chill plate overlapping the chill plate of the other roll, a nipper jaw, and a feed segment, the feed segments and the nipper jaws being in the same plane and coöperating to cut off a spike blank from a spike bar and feed the spike bar forward a distance less than the length of the spike blank, and means for adjusting the nipper jaws radially.

14. The combination, in a spike machine, of a pair of nipper rolls, each nipper roll comprising a chill plate which overlaps the corresponding chill plate of the other nipper roll, a nipper jaw, and a feed segment, and means for moving the two nipper rolls axially relatively to each other to bring the chill plates into and out of engagement with the spike bar as the feed segment and nipper jaws act and cease acting thereon.

15. The combination, in a spike machine, of a pair of nipper rolls, each nipper roll comprising a nipper jaw and a chill plate which overlaps the corresponding chill plate of the other nipper roll, and means for moving the two nipper rolls axially relatively to each other to bring the chill plates into and out of engagement with the spike bar as the nipper jaws act and cease acting thereon.

16. The combination, in a spike machine, of a pair of nipper rolls, each nipper roll comprising a chill plate which overlaps the corresponding chill plate of the other nipper roll, a nipper jaw, and a feed segment, means for moving the two nipper rolls axially relatively to each other to bring the chill plates into and out of engagement with the spike bar as the feed segment and nipper jaws act and cease acting thereon, and auxiliary feed mechanism for feeding the spike bar forward the length of the desired spike blank between operations of the nipper jaws.

17. The combination, in a spike machine, of a pair of nipper rolls, each nipper roll comprising a nipper jaw and a chill plate which overlaps the corresponding chill plate of the other nipper roll, means for moving the two nipper rolls axially relatively to each other to bring the chill plates into and out of engagement with the spike bar as the nipper jaws act and cease acting thereon, and auxiliary feed mechanism for feeding the spike bar forward the length of the desired spike blank between operations of the nipper jaws.

18. The combination, in a spike machine, of means for feeding forward a spike bar and cutting spike blanks therefrom, dies for receiving the spike blank and holding it while a head is formed thereon, means for forming such head, and means for carrying the spike blank after it is cut off from the spike bar forward in two movements to its position within the die.

19. The combination, in a spike machine, of means for feeding forward a spike bar and cutting off spike blanks therefrom, a pair of dies for holding the spike blank while the spike head is being formed, means for forming such head, and a pair of feed fingers for grasping the spike blank after it has been cut off and carrying it forward to an intermediate position, then returning, and then making a second forward movement in which it pushes the spike blank from the intermediate position to its position within the dies.

20. The combination, in a spike machine, of means for feeding forward a spike bar and cutting off spike blanks therefrom, a pair of dies for holding the spike blank while the spike head is being formed, means for forming such head, a pair of feed fingers for grasping the spike blank after it has been cut off and carrying it forward to an intermediate position, then returning, and then making a second forward movement in which it pushes the spike blank from the intermediate position to its position within the dies, and driving mechanism for said feed fingers, said driving mechanism being yieldable to allow the feed fingers to remain stationary in case an obstruction is encountered.

21. The combination, in a spike machine, of means for feeding a spike bar forward and cutting spike blanks therefrom, a pair of relatively movable dies for holding the spike blanks while a head is being formed thereon, means for forming said head, a pair of reciprocating feed fingers, a reciprocating rod for operating said feed fingers, said rod in its reciprocation opening and closing said fingers toward and from each other and moving the fingers forward and back, said feed fingers in one reciprocation carrying the spike blank forward from where it has been cut off to an intermediate position, and in the next reciprocation pushing the spike blank from the intermediate position to its position within the dies, and means for moving the movable die so that the dies first act as a guide for the spike blank as it is being pushed from the intermediate position to the position in the dies and then clamp the spike blank while the head is being formed.

22. The combination, in a spike machine, of means for feeding a spike bar forward and cutting spike blanks therefrom, a pair of relatively movable dies for holding the spike blanks while a head is being formed thereon, means for forming said head, a pair of reciprocating feed fingers, and a reciprocating rod for operating said feed fingers, said rod in its reciprocation opening and closing said fingers toward and from each other and moving the fingers forward and back.

23. The combination, in a spike machine, of means for feeding a spike bar forward and cutting spike blanks therefrom, a pair of relatively movable dies for holding the spike blanks while a head is being formed thereon, means for forming said head, a pair of reciprocating feed fingers, and a reciprocating rod for operating said feed fingers, said rod in its reciprocation opening and closing said fingers toward and from each other and moving the fingers forward and back, said feed fingers in one reciprocation carrying the spike blank forward from where it has been cut off to an intermediate position, and in the next reciprocation pushing the spike blank from the intermediate position to its position within the dies.

24. The combination, in a spike machine, of means for feeding a spike bar forward and cutting spike blanks therefrom, dies for holding a spike blank while the head is being formed thereon, header mechanism, and a pair of feed fingers for moving the spike blank from the position in which it is cut off to its position in the dies, said feed fingers operating on the sides of the spike blank and having relative movement toward and from each other crosswise of the spike blank.

25. The combination, in a spike machine, of means for feeding a spike bar forward and cutting spike blanks therefrom, dies for holding a spike blank while the head is being formed thereon, header mechanism, a pair of feed fingers for moving the spike blank from the position in which it is cut off to its position in the dies, said feed fingers operating on the sides of the spike blanks and having relative movement toward and from each other and crosswise of the spike blank, a reciprocating rod, a lost motion connection between said rod and said fingers whereby the reciprocation of the rod reciprocates the fingers in the direction of the length of the spike blank, and means whereby the lost motion produces opening and closing of the fingers.

26. The combination, in a spike machine, of means for feeding a spike bar forward and cutting spike blanks therefrom, dies for holding a spike blank while the head is being formed thereon, header mechanism, a pair of feed fingers for moving the spike blank from the position in which it is cut off to its position in the dies, said feed fingers operating on the sides of the spike blanks and having relative movement toward and from each other and crosswise of the spike blank, a reciprocating rod, a lost motion connection between said rod and said fingers whereby the reciprocation of the rod reciprocates the fingers in the direction of the length of the spike blank, means whereby the lost motion produces opening and closing of the fingers, and means for reciprocating said rod, said last named means allowing slipping if an obstacle is encountered.

27. The combination, in a spike machine, of means for feeding a spike bar forward and cutting spike blanks therefrom, feeding means for taking the cut off spike blank and carrying it forward, dies for holding the spike blank after it has been thus carried forward, header mechanism coöperating with said dies to form the spike head, and a gage finger for limiting the forward movement of the spike blank.

28. The combination, in a spike machine, of means for feeding a spike bar forward and cutting spike blanks therefrom, feeding means for taking the cut off spike blank and carrying it forward, dies for holding the spike blank after it has been thus carried forward, header mechanism coöperating with said dies to form the spike head, a gage finger for limiting the forward movement of the spike blank, a rock shaft on which said gage finger is mounted, and means for tilting said rock shaft by the action of the header.

29. The combination, in a spike machine, of means for feeding a spike bar forward and cutting spike blanks therefrom, feeding means for taking the cut off spike blank and carrying it forward, dies for holding the spike blank after it has been thus carried forward, header mechanism coöperating with said dies to form the spike head, a gage finger for limiting the forward movement of the spike blank, a rock shaft on which said gage finger is mounted, means for tilting said rock shaft by the action of the header, and a driving mechanism for the spike blank feeding mechanism permitting said feeding mechanism to stop in case the spike blank strikes the gage finger before the completion of the normal movement of the feeding mechanism.

30. The combination, in a spike machine, of a pair of nipper rolls, said nipper rolls being provided with nipper jaws for cutting off a spike blank from a spike bar, feed segments for feeding the spike bar forward, and chill plates for bearing against the sides of the spike bar for preventing spreading thereof as the spike is formed, the chill plates on the two nipper rolls overlapping and bearing against opposite sides of the spike bar, and means for moving the chill plates axially relatively to each other to bear against the spike bar as the feed segments and nipper jaws begin to act thereon and to release the spike bar at the completion of such action.

31. The combination, in a spike machine, of a pair of nipper rolls, said nipper rolls being provided with nipper jaws for cutting off a spike blank from a spike bar, and chill plates for bearing against the sides of the spike bar for preventing spreading thereof as the spike is formed, the chill plates on the two nipper rolls overlapping and bearing against opposite sides of the spike bar, and means for moving the chill plates axially relatively to each other to bear against the spike bar as the nipper jaws begin to act thereon and to release the spike bar at the completion of such action.

32. The combination, in a spike machine, of a pair of nipper rolls, said nipper rolls being provided with nipper jaws for cutting off a spike blank from a spike bar, feed segments for feeding the spike bar forward, and chill plates for bearing against the sides of the spike bar for preventing spreading thereof as the spike is formed, the chill plates on the two nipper rolls overlapping and bearing against opposite sides of the spike bar, and means for moving the nipper rolls axially relatively to each other to bear against the spike bar as the feed segments and nipper jaws begin to act thereon and to release the spike bar at the completion of such action.

33. The combination, in a spike machine, of a pair of nipper rolls, said nipper rolls being provided with nipper jaws for cutting off a spike blank from a spike bar, and chill plates for bearing against the sides of the spike bar for preventing spreading thereof as the spike is formed, the chill plates on the two nipper rolls overlapping and bearing against opposite sides of the spike bar, and means for moving the nipper rolls axially relatively to each other to bear against the spike bar as the nipper jaws begin to act thereon and to release the spike bar at the completion of such action.

34. The combination, in a spike machine, of a pair of nipper rolls, said nipper rolls being provided with nipper jaws for cutting off a spike blank from a spike bar, feed segments for feeding the spike bar forward, and chill plates for bearing against the sides of the spike bar for preventing spreading thereof as the spike is formed, the chill plates on the two nipper rolls overlapping and bearing against opposite sides of the spike bar, means for moving the nipper rolls axially relatively to each other to bear against the spike bar as the feed segments and nipper jaws begin to act thereon and to release the spike bar at the completion of such action, and auxiliary means for feeding the spike bar forward between successive actions of the nipper jaws thereon.

35. The combination, in a spike machine, of a pair of nipper rolls, said nipper rolls being provided with nipper jaws for cutting off a spike blank from a spike bar, and chill plates for bearing against the sides of the spike bar for preventing spreading thereof as the spike is formed, the chill plates on the two nipper rolls overlapping and bearing against opposite sides of the spike bar, means for moving the nipper rolls axially relatively to each other to bear against the spike bar as the nipper jaws begin to act thereon and to release the spike bar at the completion of such action, and auxiliary means for feeding the spike bar forward between successive actions of the nipper jaws thereon.

36. The combination, in a spike machine, of a pair of nipper rolls, said nipper rolls being provided with nipper jaws for cutting off a spike blank from a spike bar, feed segments for feeding the spike bar forward, and chill plates bearing against the sides of the spike bar for preventing spreading thereof as the spike is formed, the chill plates on the two nipper rolls overlapping and bearing against opposite sides of the spike bar while the nipper jaws and feed segments act thereon but leaving the spike bar free at other times.

37. The combination, in a spike machine, of a pair of nipper rolls, said nipper rolls being provided with nipper jaws for cutting off a spike blank from a spike bar, and chill plates bearing against the sides of the spike bar for preventing spreading thereof as the spike is formed, the chill plates on the two nipper rolls overlapping and bearing against opposite sides of the spike bar while the nipper jaws act thereon but leaving the spike bar free at other times.

In witness whereof, I have hereunto set my hand and seal at Indianapolis, Indiana, this twentieth day of Septemper, A. D. one thousand nine hundred and twelve.

JOHN M. STETTER. [L. S.]

Witnesses:
G. B. SCHLEY,
FRANK A. FAHLE.

Copies of this patent may be obtained for five cents each, by addressing the "Commissioner of Patents, Washington, D. C."